United States Patent

[11] 3,603,360

[72] Inventor Harold R. Botefuhr
 Bensenville, Ill.
[21] Appl. No. 849,731
[22] Filed Aug. 13, 1969
 Division of Ser. No. 594,084, Nov. 14, 1966,
 Pat. No. 3,482,610
[45] Patented Sept. 7, 1971
[73] Assignee G. W. Murphy Industries, Inc.

[54] RADIAL ARM SAW
 4 Claims, 12 Drawing Figs.
[52] U.S. Cl. .................................................. 143/6 A
[51] Int. Cl. ................................................... B27b 5/20
[50] Field of Search .......................................... 143/6, 47;
 279/2

[56] References Cited
UNITED STATES PATENTS
| | | | |
|---|---|---|---|
| 2,382,971 | 8/1945 | Brocco et al. ................ | 143/6-1 |
| 2,773,524 | 12/1956 | Schutz et al. ................ | 143/6-1 X |
| 2,835,498 | 5/1958 | Howes .......................... | 279/2 |
| 2,933,111 | 4/1960 | Fish .............................. | 143/6-1 |

Primary Examiner—Donald R. Schran
Attorney—Hofgren, Wegner, Allen, Stellman & McCord ABSTRACT: A radial arm saw is provided with a column having a radial arm for supporting a motor driven saw over a work surface. A housing for the motor-driven saw is provided with a brake and actuator means for adjusting the housing, and accordingly the saw, about a horizontal axis whereby very accurate angled cuts can be provided. Adjustment means are also provided for the housing about the vertical axis for additional saw orientation adjustments.

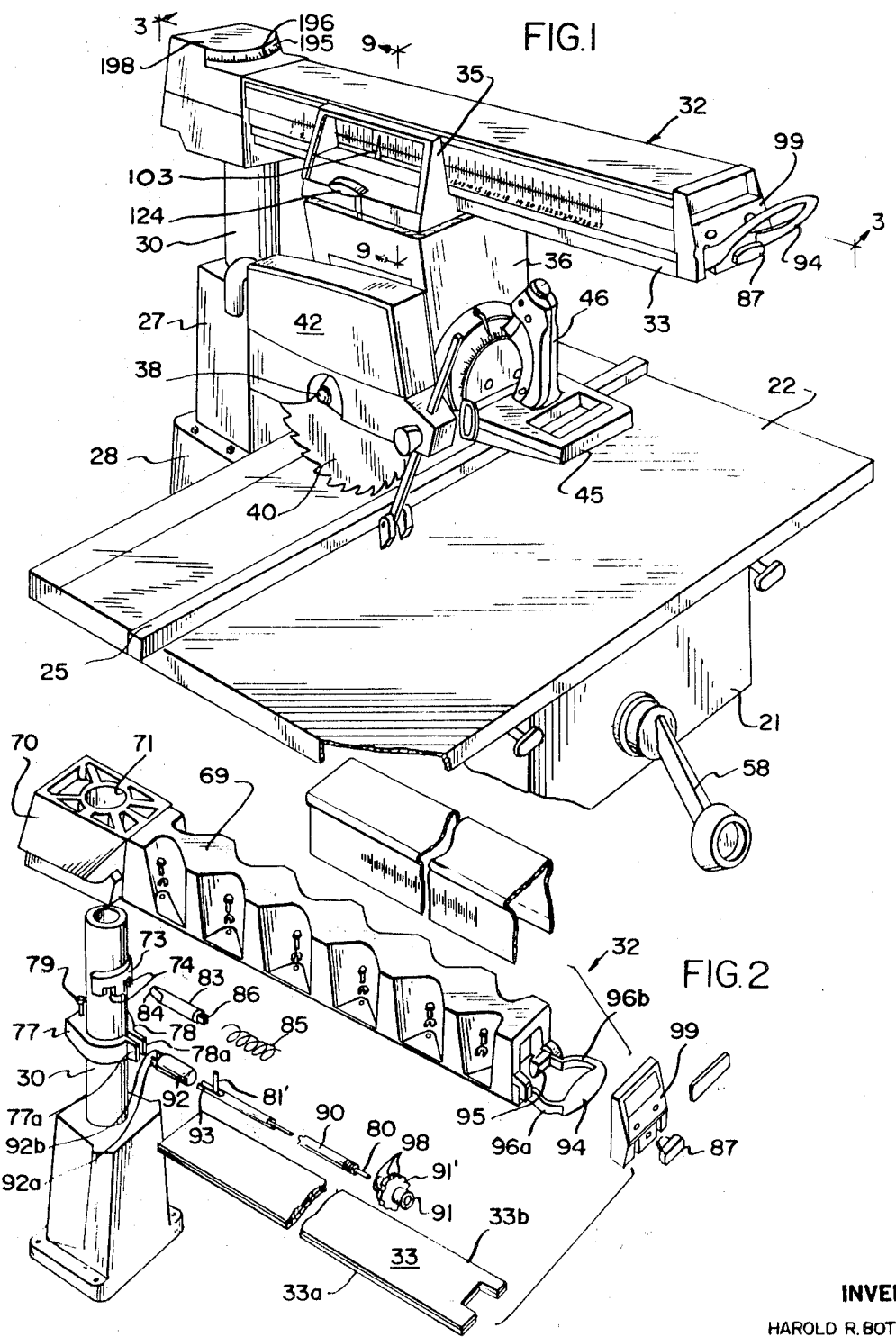

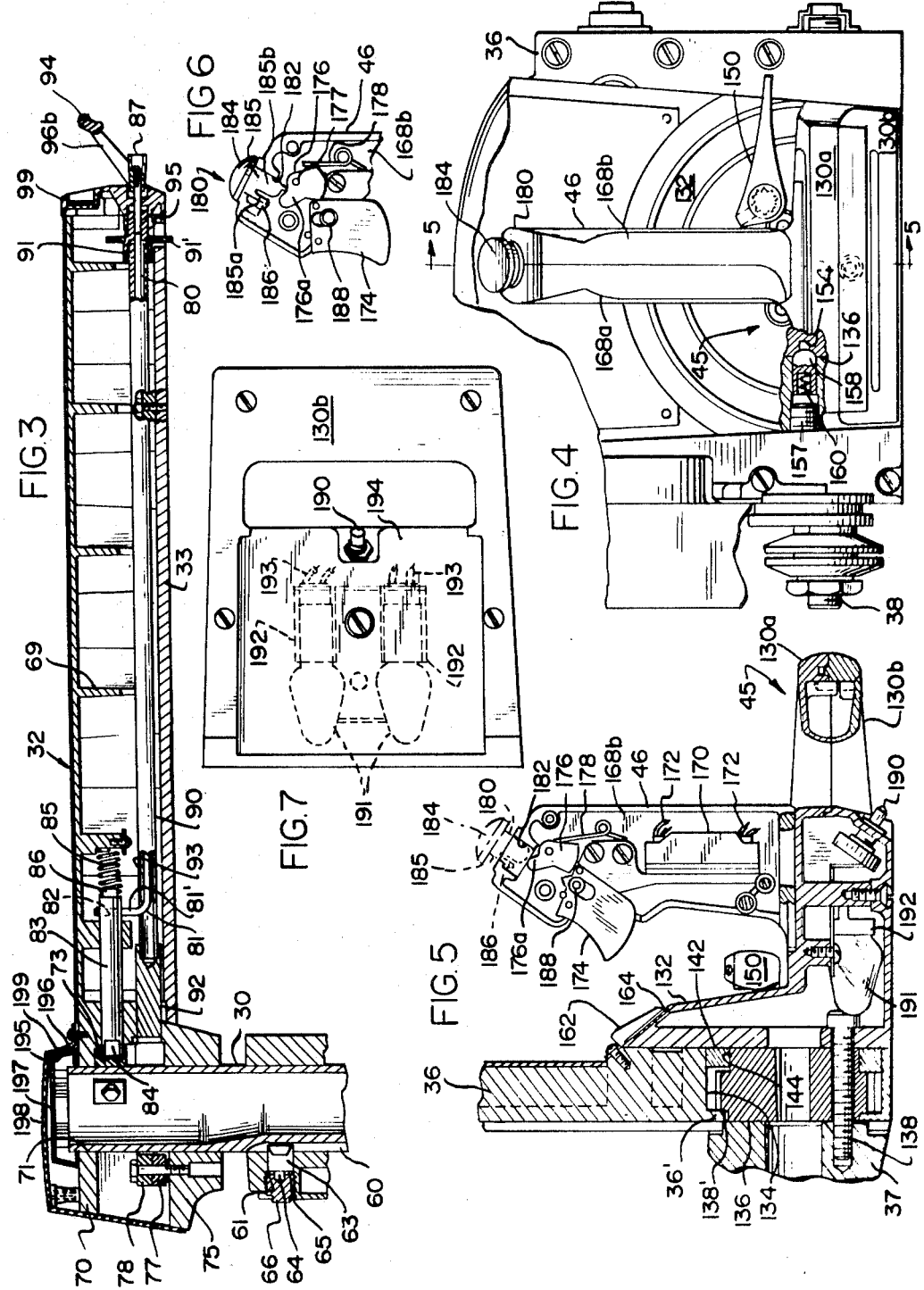

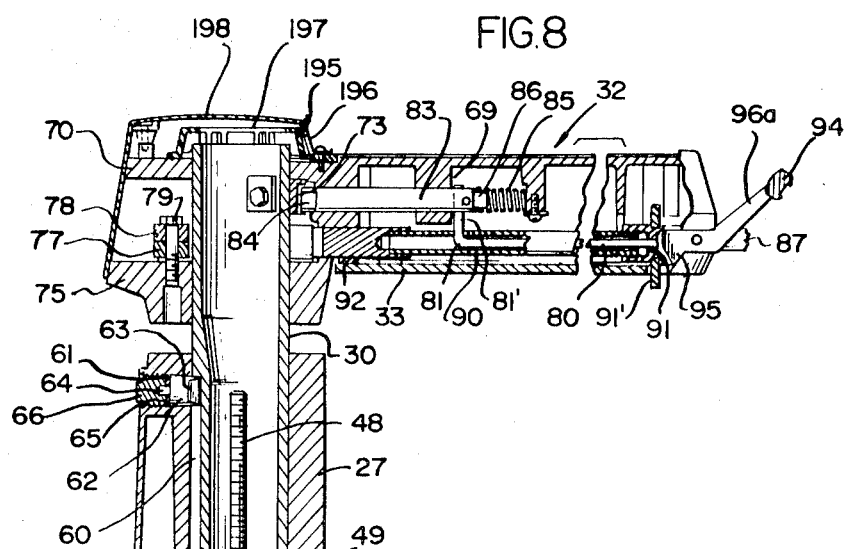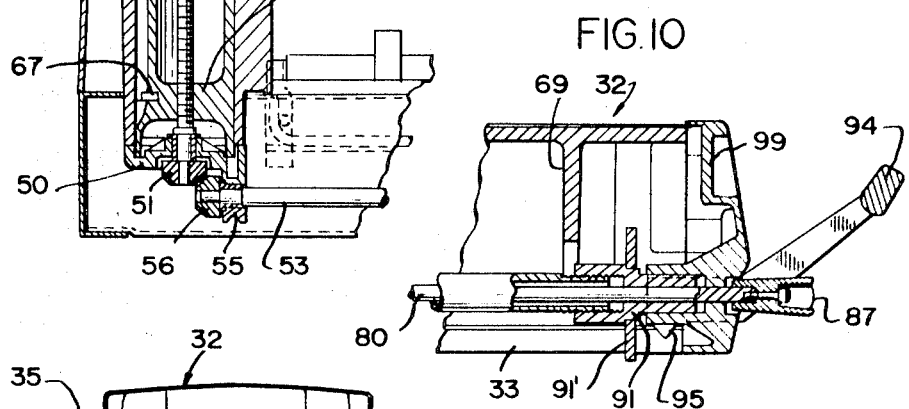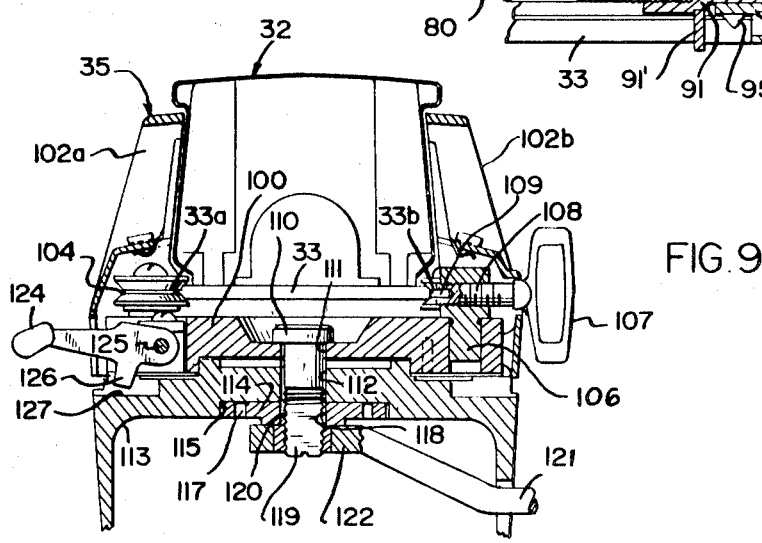

3,603,360

RADIAL ARM SAW

This application is a Divisional Application of my copending application entitled RADIAL ARM SAW, filed Nov. 14, 1966, Ser. No. 594,084, and assigned to the common assignee G. W. Murphy Industries, Inc., now U.S. Pat. No. 3,482,610.

The invention relates to radial arm saws and more particularly to the operation and the adjustment of radial arm saws.

Radial arm saws have been known in one form or another for many years. The principal advantage generally to radial arm saws lies in the fact that the workpiece is held on a worktable while the saw is moved over and through the workpiece. Known radial arm saws have provision for performing many different types of cuts and are adaptable for conversion for use as a drill press, sander, grinder and the like.

The prior and current radial arm saws can be unsafe for children or people who are unfamiliar with power tools in general or with radial arm saws in particular. Also, current radial arm saws have awkwardly placed or inconveniently operative adjusting means for setting the angular position of the arm relative to the worktable, for setting the angle of the saw blade relative to the workpiece, for guiding the vertical column relative to the workpiece and for guiding the horizontal position of the saw along the arm, all of which limits the efficiency, acceptability and usefulness of the saw as a convenient home and commercial workshop tool.

It is therefore a principal object of this invention to overcome the above noted disadvantages of the prior art and to produce an improved radial arm saw thereby.

It is another important object of my invention to provide an improved key-actuated pistol grip actuator member which prevents accidental operation of a power tool.

Another object of my invention is to provide an improved power tool having a pistol grip actuator mechanism with a key which completely deactivates the trigger mechanism when removed.

Another object of my invention is to provide an improved power tool having a key means associated with a pistol grip mechanism wherein the key means in one position in the mechanism prevents actuation of the trigger mechanism and in a second position in the mechanism permits the trigger mechanism to be operative.

It is another object of my invention to provide an improved radial arm saw having the majority of the adjusting means conveniently located at the work station of the saw.

It is still another object of my invention to provide an improved radial arm saw having dual locking means for positioning the radial arm either in a preselected angular position with respect to the axis of the vertical column, or in any one of an infinite number of intermediately selected positions of the radial arm relative to the axis of the column.

It is a still further object of my invention to provide an improved fence-positioning means for the worktable which permits a plurality of different arrangements with a minimum of parts.

And it is still another object of my invention to provide an improved resiliently urged guide means for the vertical column which reduces play or slack between the column and the worktable base while maintaining adjustability of the arm vertically relative to the worktable.

And a still further object of my invention is to provide an improved motor housing bracket adjusting means whereby the motor housing can be adjusted relative to the arm about a vertical axis of the bracket.

And yet another object of my invention is to provide an improved means for adjusting the motor and saw relative to the motor housing bracket about an axis perpendicular to the axis of the shaft so that the blade can be positioned at any one of a preselected number of angular positions or at any one of an infinite number of intermediate angular positions.

Another object of my invention is to provide an improved radial arm saw having track wiper means between the motor housing bracket and the track on the radial arm for improved operation of the motor housing along the length of the arm.

Another object of my invention is to provide an improved radial arm saw having a readily viewable scale mounted on a vertical column past which an indicator mounted on the arm sweeps for indicating the relative angular positions between the arm and the column.

The foregoing objects and advantages of the invention will be made clear in the following specification taken in conjunction with the accompanying drawings, in which:

FIG. 1 is a perspective view showing my new radial arm saw with the improved actuator key in position and with the improved adjusting means illustrated;

FIG. 2 is an exploded perspective view of the improved radial arm positioning and locking means;

FIG. 3 is a cross-sectional view taken on the line 3—3 of FIG. 1;

FIG. 4 is a front view, partially broken away, of the motor housing and saw blade arbor showing the handgrip and key arrangement;

FIG. 5 is a cross-sectional view taken on the line 5—5 of FIG. 4;

FIG. 6 is a partial cross-sectional view of the mechanism of FIG. 5 only with the key depressed so that the trigger switch can operate;

FIG. 7 is a bottom view of the forward portion of the hand actuator showing the work illuminating means;

FIG. 8 is a cross-sectional view through the vertical column and radial arm with the front portion of the arm taken on a plane spaced in front of the plane of the centerline of the arm;

FIG. 9 is a partial cross-sectional view taken on the line 9—9 of FIG. 1;

FIG. 10 is an enlarged cross-sectional view of the forward portion of the radial arm similar to FIG. 3;

Figure 11:
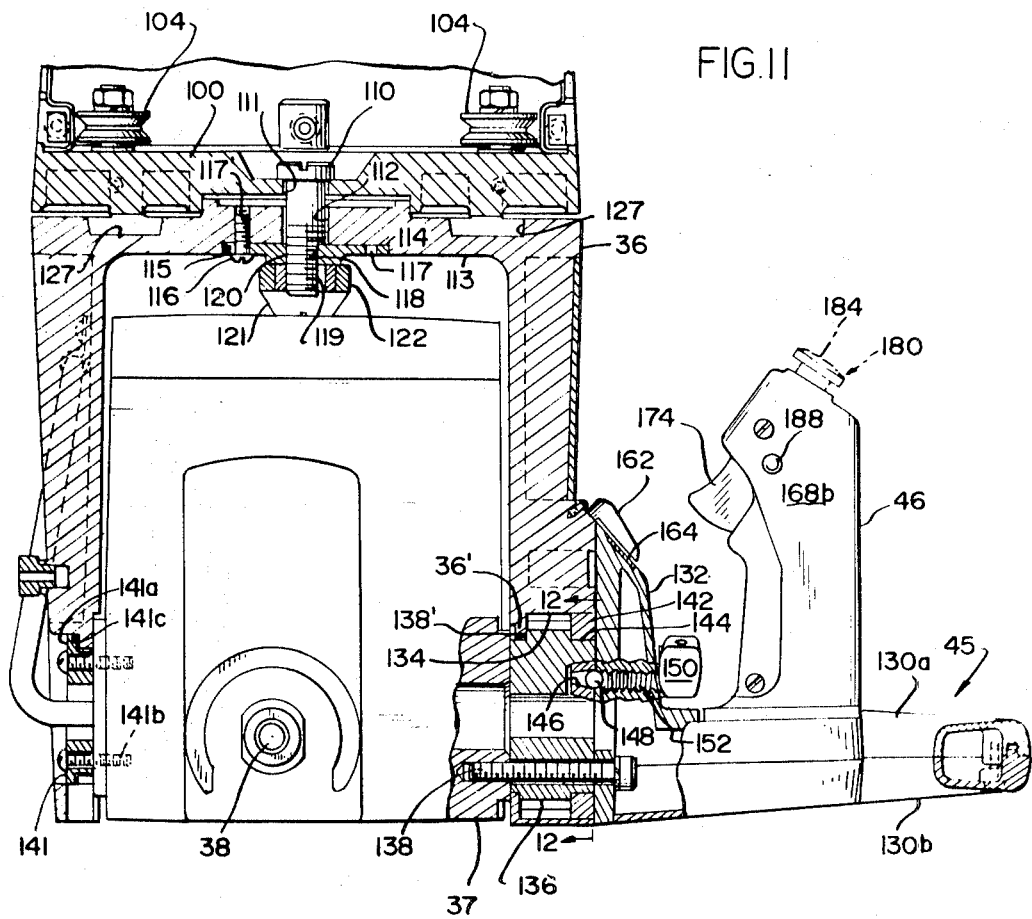
FIG. 11 is a cross-sectional view through part of the motor housing bracket with the motor housing and hand actuator shown in full lines.
Figure 12:
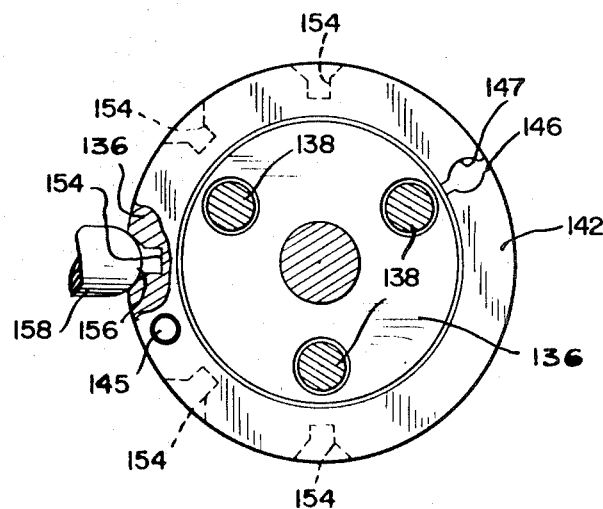
FIG. 12 is an enlarged cross-sectional view taken on the line 12—12 of FIG. 11.

As illustrated generally in FIG. 1, a radial arm saw mechanism 20 is comprised of a base 21 which is adapted to rest on a solid, preferably level surface, such as a concrete floor. The top portion of the base has a laterally and transversely extending worktable support 22 upon which is adjustably positioned a guide fence 25. A column support 27 is bolted to a rearwardly extending portion 28 of the base 21 and has a vertical column 30 upwardly projecting therefrom. A radial arm member 32 is pivotally mounted on the top portion of the column 30. A plate 33 is secured to the bottom of arm 32, the opposite longitudinally extending edges of the plate affording a pair of horizontally disposed tracks 33a and 33b along which is movably positioned a motor housing bracket 35 supporting a motor housing 36. Motor housing 36 includes motor assembly 37 which drives a shaft from which projects the arbor member 38. A saw blade 40 is locked to the arbor 38 and has a saw blade guard 42 positioned over the major portion of the blade. A handle 45 and pistol grip mechanism 46 are connected rigidly together and with the motor housing and are pivotally mounted about an axis transverse to the axis of the arbor shaft 38 in the lower portion of the motor housing 36 as will be described later herein.

As shown in FIGS. 1, 3 and 8, the vertical column 30 is slidably positioned in the column support 27 and is adapted to be telescopically extended into and out of said support 27 by means of the interaction between the screw 48 and nut 49 arrangement in the lower portion of said support 27. The screw 48 is rotatably mounted in a bracket 50 in the rear portion of the base 21 and has a beveled gear 51 keyed to the lower end portion of said screw 48. For rotating the screw 48, a horizontally disposed rod 53 is mounted for rotation about its axis in a pair of bearings 55 carried in brackets in said base. One portion of said rod 53 has a beveled gear 56 which meshes with the beveled gear 51 on the screw 48. The forward portion of the rod 53 extends through the front of the base 21 and is keyed to a crank arm 58 projecting forwardly of said base whereby rotation of the crank 58 in one direction will raise the column 30 and its attached radial arm 32 and rotation in the opposite direction will lower same.

The vertical column 30 has a keyway 60 formed in the rear surface thereof. A threaded opening 61 is formed in the column member 27 in alignment with said keyway 60 in the column. A guide pin 62 having a wedge-shaped forward portion 63 is slidably disposed in the opening 61 in the column 27 with the wedge 63 nesting in the keyway 60 in the column. A locator pin 64 projects rearwardly from the guide pin 62 and passes through the center of a Belleville spring 65. A threaded plug 66 is screwed into the opening 61 of the column with the locator pin 64 on the guide pin 62 sliding freely in a mating aperture formed in the plug. A hexagonal head is formed on the plug 66 so that the plug 66 and guide pin 62 can be adjusted together toward the column. The wedge-shaped portion 63 of the guide pin 62 is urged into the keyway 60 of the column by means of the compression of the Belleville spring 65 and the tightening of the plug 66 toward said column. The spring 65 provides a small amount of resilience to the guide pin 62 so as to keep the guide pin 62 nested in the keyway 60 without a positive bind therebetween. The coaction between the guide pin 62 and the keyway 60 will limit, if not eliminate, the sidewise or lateral play of the arm about its pivotal axis.

A stop 67 in the lower end of the keyway 60 is adapted to engage with the guide pin 62 so that the column 30 cannot advance beyond a predetermined point relative to the table 22. Upon turning the crank 58 on the front of the base 21, the column 30 and the radial arm 32 will raise and lower with the guide pin 62 sliding in the keyway 60 so as to prevent rotation of the column 30 about its axis. The fit is sufficient to permit the column 30 to slide axially relative to the column support but substantially eliminates lateral play between the column and the support.

The radial arm 32, as shown in FIGS. 1, 2, 3, 8 and 10, has a die-cast body portion 69 which is hollow and ribbed from below. The arm has an enlarged rear portion 70 in which is formed cylindrical opening 71. The internal diameter of the opening 71 is such as to slidably fit about the outer diameter of the column 30. The upper cylindrical portion of the column 30 has a segment 73 bolted thereto in a centrally located position facing toward the worktable 22. The segment 73 has at least three vertically disposed wedge-shaped grooves 74 formed in the outer surface thereof. The middle groove 74 has its centerline extending in the vertical plane cutting the table 21 in half while the centerlines of the two additional grooves 74 lie in planes which are angled 45° away from the plane of the middle groove with all three planes intersecting at the centerline of the column 30. The rear enlarged portion 70 of the radial arm 32 also has a die cast lower half or mounting member 75 which is assembled by bolts to the portion 70 of the radial arm so as to encase the arm 32 about the segment 73 on the column 30.

As shown in FIGS. 2, 3 and 8, a pair of mating brake members 77, 78 are bolted at 79 to the inside of the mounting member 75 so as to substantially encircle the column 30. Brake members 77, 78 are movable relative to each other and relative to column 30 which they encircle. When the brake members are moved toward the column, they engage the same in clamping relation to lock the arm against swinging movement. Each brake member 77, 78 has a generally radially outwardly extending free end 77a, 78a, respectively, which may be engaged to pinch or draw the two brake members together.

A radial arm-adjusting arrangement is provided in the arm for releasing or locking the arm relative to the axis of the column either in predetermined steps or in infinite adjustments. Specifically, an elongate actuator rod 80 extends from a position just forward of the front of the radial arm through the inner cavity of the arm to a right angular bend 81 therein located near the rear end portion of said arm. The leg 81' of the rod that extends upwardly therefrom fits into a slot 82 formed in a positioning pin 83 axially guided along the length of the arm. A forward end 84 of said pin is wedge-shaped and is adapted to fit in any one of the grooves 74 formed in the positioning segment on the column. A compression spring 85 is positioned by the one web of the arm and an undercut projection 86 on the rear of the pin for urging the pin into the grooves in the positioning segment.

An actuating handle 87 is mounted forward of the front of the arm in position to be gripped and pulled toward the operator. Handle 87 is connected to rod 80 so that outward movement of handle 87 will move the rod 80 to compress the spring 85 to permit the arm to be swung about the column to any desired position. Release of the handle will permit the spring to drive the pin 83 toward the segment 73 so that the forward part 84 of the pin will drag along the surface of the segment until it drops into an aligned groove 74 therein.

The means for infinitely adjusting the arm relative to the column is provided by an elongate tubular sleeve 90 slidably positioned about the outer surface of the rod 80 within the confines of the die cast arm. Sleeve 90 has a cap member 91 having a flared cam surfaced flange 91' fastened thereto threaded on the forward or one end of said sleeve. The other or rear end of said sleeve is connected to a split brake actuator 92 such that the split ends 92a and 92b thereof are movable toward and away from column 30 responsive to movement of sleeve 90. Split ends 92a and 92b are generally of a size to nestably engage ends 77a, 78a of the brake members to draw brake members 77 and 78 together when sleeve 90 moves actuator 92 toward column 30 and brake members 77 and 78. The upper surface of the sleeve has an elongate axially extending slot 93 formed therein through which the upwardly extending leg 81' of the rod 80 projects such that the rod 80 can be moved relative to the sleeve 90 without interference therewith.

A U-shaped handle 94 is pivotally mounted on the sidewalls of the front portion of the arm and has cam-shaped projections 95 formed on the bifurcated legs 96a and 96b thereof such that pivoting the handle about its mountings will cause the cam surfaces on the projections 95 to engage the flange member 91' on the cap member 91 of the sleeve for moving the sleeve 90 along the axis of the arm for actuating the brake members 77 and 78 relative to the column 30. Downward movement of the handle 94 will release the friction brake members 77 and 78 from the column. The flange member 91' is fastened to the member 91 which is threaded on the forward end of rod 80 and as can be seen in FIG. 2, has notches 98 formed around the outer circumference thereof. These notches can be used to grip the flange 91' to rotate the flange and member 91 relative to the sleeve 90 for adjusting the operative distance between the contact surface of the flange 91' relative to the brake members 77, 78 on the column. In this way, wear or slack can be taken up without affecting the operativeness of the angular adjusting means of the arm relative to the column. A cover 99 is adapted to be fastened to the front end of the radial arm through which the handles 94 and 87 project.

Means are provided for rotating the motor housing 36 relative to the motor housing bracket 35 about an axis transverse to the length of arm 32 to thereby adjust the saw blade 40 for mitering at different selected angles. To this end, motor housing bracket 35 includes a baseplate 100 which is pivoted to the motor housing 36 in a manner to be described later. Opposite side cover plates or frames 102a and 102b extend upwardly from either side of baseplate 100 and embrace arm 32 to generally complete the bracket assembly. Each side cover plate 102a and 102b has an opening exposing the appropriate indicia along the length of the arm 32. An indicator 103 is carried on each side frame to indicate the distance the center of the blade is from the center of the column. A plurality of track bearings 104 are secured to baseplate 100 on either side of the bottom plate 33 of arm 32 in rolling contact with the opposite tracks 33a and 33b formed along the longitudinal edges of plate 33. Preferably, these track bearings take the form of pulleylike wheels.

As best seen in FIG. 9, a lock handle 107 projects through side cover frame 102b and is threaded through the lug 106 carried by the baseplate 100 with the threaded shank 108 of handle 107 carrying a pin 109 which is in a position to abut track surface 33b of plate 33. By loosening and tightening handle 107, the motor housing bracket 35 and motor housing 36 may be moved and locked at selected positions along the length of arm 32.

With particular reference to FIGS. 9 and 11, a pivot bolt 110 extends through an opening 111 in plate 100 and an opening 112 in bridge portion 113 of housing 36. An index plate 114 is positioned in a recess 115 in the underside of bridge 113 and secured therein by means of machine screw 116 (FIG. 11) which extends through one of a plurality of positioning openings 117 formed in index plate 114 and into threaded opening 117' in bridge 113. Index plate 114 is also provided with a D-shaped opening 118 of a size and shape to conform to the flat portion 119 formed on the threaded shank 120 of bolt 110.

A turning handle 121 has an end portion 122 which is threaded on bolt shank 120 below index plate 114. Loosening movement of handle 121 relative to bolt 110 permits a rotational movement of housing 36 relative to the baseplate 100 of the motor housing bracket 35, and tightening movement of handle 121 locks housing 36 against rotational movement relative to plate 100 of the motor housing bracket 36. Since handle 121 extends through a slot in the side of the motor housing 36, its swinging movement is limited so that over a period of time the wear and set of the parts becomes such that the handle movement is not enough to lock the motor housing 36 relative to the motor housing bracket 35. At that time, by removing the screw 116 and rotating plate 114 and screw 110 sufficient to align the next hole 117 with the opening 117' and reinserting screw 116 will provide sufficient adjustment that the movement of the handle 121 will again lock the housing 36 relative to the baseplate 100 of the motor housing bracket 35. This adjustment does not require disassembly of part of the arm as was necessary heretofore.

The rotational adjustment means further includes a lock handle 124 which is pivoted at 125 to a portion of plate 100 of the bracket 35. A downwardly projecting finger 126 of handle 125 occupies one of a plurality of spaced notches 127 formed in bridge 113 of housing 36. Before housing 36 can be rotated relative to plate 100, even after handle 121 is loosened, it is necessary for handle 124 to be raised so that the finger 126 is extracted from occupation in one of the notches 127. When this is done, the housing 36 may be rotated to an infinite number of positions of angular adjustment with respect to plate 100 of bracket 35 and, therefore, likewise relative to the arm 32. In the preferred embodiment, four such notches 127 are formed so that rapid coarse adjustment to four positions spaced 90° apart may be accomplished simply by swinging the housing to one of the remaining three notches 127 and returning the handle 124 to the locking position.

Means are further provided for adjusting the planar disposition of the saw blade 40 relative to the worktable 22 for bevel cutting or the like. With particular reference to FIGS. 4, 5, 11 and 12, index handle 45 to which pistol grip 46 is secured includes an upper or support half 130a and a bottom cover half 130 b. The support half 130a has an uprightly disposed rounded flange portion 132 which abuts the side of housing 36 adjacent opening 134 formed in the lower end of housing 36. A pivot bushing 136 is positioned in opening 134 and secured by means of capscrews 138 to the motor assembly 37 which is positioned between the legs of motor housing 36. The bushing 136 has an undercut portion 138' in which extends the continuous flange portion 36' of the wall of the housing for retaining the motor assembly 37 for rotation relative to the housing 36 about an axis perpendicular to the axis of the arbor 38. At the opposite end a bushing 141 with an overhanging portion 141a is secured by screws 141b to motor assembly 37 to rotatably mount the motor with respect to an opening 141c formed in the opposite side of the motor housing 36. In this manner, the motor assembly 37 is pivotally mounted with respect to the motor housing 36.

A brake ring 142 is positioned in the peripheral groove 144 of pivot bushing 136 by means of a pin 145 extending through the ring 142 and into the bushing 136. The ring is split at 146 with a ball-like opening 147 for receiving a wedging member such as a free-floating ball 148. The wedging member or ball 148 is forced into the opening by movement of a handle 150 which is threaded into the threaded opening 152 formed in the flange portion 132 on the handle 45 so that turning of the handle 150 urges the wedging member or ball inwardly to spread the ring for locking the motor relative to the housing 36. Reverse turning of the handle permits the resiliency of the ring and the taper of the opening 147 to force the wedging member or ball outwardly from the beveled ball-like split opening 147 in brake ring 142 to release the brake and permit turning of the motor relative to the housing. Depending upon whether the wedging member or ball is pushed inwardly or permitted to move outwardly from opening 146 in split 147, the brake ring 142 will expand or retract thereby tightening or loosening, respectively, the pivot bushing 136 brake ring 142 and its associated motor assembly 37 and handle 45 with respect to the opening 134 and housing 36.

The outer periphery of bushing 136 is provided with a plurality of index openings 154 which are adapted to mate with the reduced beveled end 156 of plunger 158. An indexing member such as a plunger 158 is urged laterally inwardly into the openings 154 by means of spring 160 which is positioned behind the indexing member or plunger 158 within the sidewall of the housing 36 by means of a threaded plug 157. When handle 150 is turned to permit the wedging member or ball 148 to retract from the opening 147 and thereby loosen the bushing 136 and brake ring 142 relative to the wall of the opening 134, the bushing 136, brake ring 142 and the motor assembly 37 will be permitted to rotate with respect to the bracket 36, thereby tilting blade 40. As the handle 46 is grasped to turn the motor assembly structure, the indexing member or plunger 158 is cammed outwardly from the notches 154. A plurality of such notches 154 are formed in the periphery of the bushing 136 at predetermined locations such that the saw blade can be indexed to positions of standard angular displacement for instance along a plane at 45° and 90° with respect to the vertical position thereof. For adjustment of the blade to an infinite number of angular positions between the range afforded by the spaced notches 154, the handle 150 is merely tightened at the desired position of angular displacement. To assist in determining the proper angular orientation, a pointer 162 is mounted on housing 36 for cooperation with a scale 164 provided on the outer face of flange portion 132 from which the reading of angular displacement of the motor assembly may be obtained.

The pistol grip portion 46 of the handle is provided with a novel locking means for preventing actuation of the saw structure. This means is best illustrated in FIGS. 5, 6 and 11. As shown therein, handle 46 includes two half pieces 168a and 168b which are secured together to form the unit. A switch unit 170 is mounted interiorly of the handle means, secured to the handle half 168b. Lead wires 172 extend from the switch to a connection with the motor means (not shown) in the usual manner so that appropriate actuation of the switch will activate the motor accordingly. A trigger member 174 is pivoted to 168b and is linked by means (not shown) to switch 170 so that retraction of trigger 174 actuates switch 170 to the "on" position in a fashion which is typical for power tools in other similar electrically operated devices.

A dog 176 is pivoted at 177 to 168b and urged by leaf spring 178 to normally occupy a position blocking retraction of trigger 174 so that it is impossible to retract the trigger and therefore impossible to activate switch 170 when the dog 176 is in the position as shown in FIG. 5. The dog 176 has a finger 176a which protrudes upwardly adjacent a key 180 occupying a slot 182 formed in the top of the handle 46. The key has an enlarged transversely disposed head or button 184 and a split shank 185, one side 185a of the shank having an enlargement 186 so that the key shank 185 has a portion which is wider than slot 182.

Preferably, the key is made of a suitable yieldable material such as plastic or the like so that the key may be withdrawn from the slot by the camming of the enlargement 186 past the relatively smaller confines of the slot 182, this camming facilitated by the split nature of the shank of a key. In the same manner, the key may be reinserted in the slot by the reverse movement of that required to withdraw the same. When so inserted, the enlargement 186 prevents accidental dislodgement or withdrawal of the key from the slot but, as previously described, it does permit manual extraction of the key from the slot.

When the key is depressed by pushing on the head or the button portion 184, the enlarged side 185a of the shank 185 on the key strikes the finger portion 176a of the dog and rotates the dog about the pivot 177 in opposition to the influence of spring 178 to a position where the dog is out of the path of movement of the trigger 174. When the trigger 174 may be squeezed to actuate the switch, the relative positioning of the trigger and the dog for actuation of the trigger 174 being shown in FIG. 6. The handle structure is provided with the usual lock button 188 for locking the trigger in the "on" position as is conventional with power saws and the like.

Thus, in operation, to actuate the saw, the key 180 is depressed by applying pressure to the head or button end 184, thereby swinging the dog 176 out of its position blocking retraction of trigger 174. Trigger 174 is then squeezed to retract the same and actuate switch 170, which sends an appropriate signal to the motor in the motor housing, thereby activating the saw. Once pressure on trigger 174 is released, it returns to the position shown in FIG. 5; and if pressure is released from the key 180, it also returns to the position shown in FIG. 5, with dog 176 blocking retraction of the trigger 174 and therefore preventing actuation of the device. During periods of nonuse, the key 180 may be simply withdrawn from the slot 182 and without the key it is impossible for others to activate the saw.

It is believed to be obvious that the key-operating system just described is not exclusively confined to a radial arm saw application. Any electrically operated hand device using a pressure switch can be equipped with my key system whereby the device cannot be operated either without the key or even with the key in place unless the key is depressed to a point to deactivate the blocking means so that the device can be switched on and off.

The handle 45 is further provided with light means for lighting the area of the work station. To this end, the handle is provided with a switch 190 which is operatively associated with a source of power (not shown) and with light bulbs 191 which are mounted in sockets 192, see FIG. 7. The usual wiring 193 extends from the sockets to a suitable connection with the switch structure (not shown). The portion of the bottom cover half 130b of the handle 45 which underlies light bulbs 191 may be provided with a translucent or lightly shaded, slightly opaque panel 194 to thereby cast a diffused light ray on the area of the worktable 22 immediately below the handle 45.

The angular position of the arm relative to a central vertical plane containing the centerline of the column 30 and a line perpendicular to said centerline and also perpendicular to the fence 25 on the horizontal worktable 22 is indicated in a novel manner by means of a scale 195 and an indicator 196. The scale 195 is calibrated on the front surface of a dome-shaped cap 197 snapped or screwed onto the top end portion of the column 30. The 0 position of the scale 195 lies in the plane defined above. A cover 198 encircles the rear end portion of the radial arm 32 and has a window 199 facing along the length of the arm. The indicator or pointer 196 is screwed to the arm along its centerline so that alignment of the pointer 196 with any number on the scale 195 will record the angular position of the arm 32 to the left or right of the vertical plane. The pointer 196 will sweep with the arm past the fixed scale carried by the column 30.

The radial arm saw of this invention is both safe and convenient to use. The several controls for positioning the arm or the blade are all located forwardly on the structure at a point of convenient access. The indicators for recording the angular positions of the arm, saw blade and housing are clearly visible. In addition, the unique key which is associated with the trigger switch for actuating the saw insures that the saw may not be set in motion either when the key is withdrawn from the opening in the handgrip or when the key is not completely depressed and held in the depressed position. Even with the key in the slot in the handle 45, the motor cannot be started until the key is depressed.

The foregoing detailed description has been given for clearness of understanding only, and no unnecessary limitations should be understood therefrom, as some modifications may be obvious to those skilled in the art.

I claim:

1. In a radial arm saw comprising a base, a work surface on the base, a column extending upwardly from the base, a generally horizontally disposed saw support arm extending generally radially outwardly from the upper end of said column, and a saw blade assembly mounted on the arm for axial movement therealong, means mounting the saw blade for bevel adjustment with respect to the arm and worktable, comprising: a saw blade motor housing including bracket means for slidable securing the housing to said arm; a motor assembly in said housing including a saw blade drive shaft constructed and arranged to support a saw blade thereon, said motor assembly mounted to said housing by spaced bushing means connected to the motor assembly and rotatably mounted within bearing apertures formed within the housing; handle means having an elongated portion disposed at a substantial angle to the axis of rotation of said motor assembly and adapted to be grasped by an operator to a. move said saw blade assembly along said support arm, and b. rotate said motor assembly within the bearing apertures in said housing and fixedly connected to one of said bushing means, an expandable brake shoe affixed to one bushing means between said bushing and the housing, said brakeshoe being slotted to receive an axially driven member; and an arm threaded to the handle means and having a leading portion extending into said housing in alignment with said brakeshoe slot, said leading portion including a member axially movable responsive to turning of said arm, said member adapted for reception in said slot to expand the brakeshoe; selective turning of said arm causing tightening or loosening of said brake to permit rotation of said motor assembly to selected positions of canted adjustment relative to the housing and arm by manipulation of said elongated portion by an operator and permit locking of the motor assembly at said selected positions.

2. The apparatus of claim 1 wherein the member adapted for reception in the slot is a ball-like member, axial movement of the ball into the slot causing expansion of the slot and therefor causing expansion of the brakeshoe member.

3. The apparatus of claim 1 wherein the outer periphery one of the bushings is provided with a plurality of outwardly facing notches and wherein the housing includes a pin member which is normally urged towards engagement with said notches, occupation of the pin member in the notches locking the motor assembly, said pins and notches being matingly formed so that rotational movement applied to the handle is sufficient to drive the pin outwardly from the notch to permit rotation of the motor assembly relative to the housing.

4. The apparatus of claim 3 wherein said notches are formed at preselected positions of angular array with respect to the housing so that rapid coarse adjustment of the motor assembly to a preselected canted position may be obtained by turning the handle and permitting the pin to find a selected notch for the desired canted displacement of the motor assembly.